United States Patent [19]

Yang

[11] Patent Number: 5,407,215
[45] Date of Patent: Apr. 18, 1995

[54] CHUCK ASSEMBLY FOR HOLDING RELEASABLY A BIT MEMBER

[75] Inventor: An-Shun Yang, Taichung Hsien, Taiwan, Prov. of China

[73] Assignee: Tsung-Hsun Yang, Taipei, Taiwan, Prov. of China

[21] Appl. No.: 175,571

[22] Filed: Dec. 30, 1993

[51] Int. Cl.⁶ .............................................. B23B 31/12
[52] U.S. Cl. ...................................... 279/64; 279/140; 279/902
[58] Field of Search ..................................... 279/60–66, 279/140, 902; 408/240

[56] References Cited

U.S. PATENT DOCUMENTS

| | | | |
|---|---|---|---|
| 4,695,065 | 9/1987 | Komatsu et al. | 279/902 |
| 5,031,925 | 7/1991 | Tatsu et al. | 279/64 |

FOREIGN PATENT DOCUMENTS

| | | | |
|---|---|---|---|
| 403049808 | 3/1991 | Japan | 279/902 |

*Primary Examiner*—Steven C. Bishop

[57] ABSTRACT

A chuck assembly includes a hollow chuck body assembly, a jaw unit provided at a lower end of the chuck body assembly, and a rotary shaft disposed in the chuck body assembly and coupled with the jaw unit. The chuck body assembly has a top surface formed with first annularly arranged ratchet teeth. The rotary shaft has an upper end portion extending outwardly from an upper end of the chuck body assembly. A sleeve member is sleeved on the chuck body assembly. A rotary ring is sleeved on the upper end portion of the rotary shaft and has a bottom surface formed with second annularly arranged ratchet teeth which engage normally the first ratchet teeth so as to restrict undesired rotation of the rotary shaft in the counterclockwise direction. A rotary knob is sleeved on the sleeve member and is coupled with the upper end portion of the rotary shaft. The chuck assembly is provided with a disengaging unit which is operatively associated with the sleeve member in such a manner that rotation of the sleeve member in the clockwise direction causes vertical movement of the movable ring so as to disengage the second ratchet teeth from the first ratchet teeth and permit rotation of the rotary shaft in the second direction.

4 Claims, 5 Drawing Sheets

CHUCK ASSEMBLY FOR HOLDING RELEASABLY A BIT MEMBER

BACKGROUND OF THE INVENTION

1. Field Of The Invention

This invention relates to a chuck assembly for holding releasably a bit member, more particularly to a chuck assembly which is constructed so as to release a bit member conveniently.

2. Description Of The Related Art

Referring to FIG. 1, a conventional chuck assembly includes a hollow chuck body assembly 10, a jaw unit, a rotary shaft 11 and a clutch assembly. A hollow body part (10A) and a top ring member (10B) mounted threadably on a top end of the hollow body part (10A) cooperatively form the chuck body assembly 10. The chuck body assembly 10 has a top surface formed with two opposed keyways 12 and an engaging slot 13 (see FIG. 2) formed on a periphery thereof. The jaw unit includes three clamping legs (L). Each of the clamping legs (L) has a hook portion (L1) formed at an upper end thereof and is received in a corresponding one of the guiding grooves (G1), which guiding grooves (G1) are formed in a seater (G). The seater (G) is disposed in a lower end portion of the chuck body assembly 10. Each of the clamping legs (L) has a lower portion extending outwardly from a lower end of the chuck body assembly 10. A cylindrical driving rod (R) is disposed in the chuck body assembly 10 and has a lower end formed with three hook receiving spaces (R1). The hook portion (L1) of each of the clamping legs (L) engages the hook receiving spaces (R1) of the driving rod (R). The driving rod (R) has a threaded outer wall. The rotary shaft 11 is disposed rotatably in the chuck body assembly 10 and has an upper end portion that extends outwardly from an upper end of the chuck body assembly 10. The rotary shaft 11 has a threaded inner wall such that the rotary shaft 11 engages the driving rod (R) threadably. Since longitudinal movement of the rotary shaft 11 relative to the chuck body assembly 10 is restricted, the rotation of the rotary shaft 11 is converted to the longitudinal movement of the driving rod (R) relative to the rotary shaft 11 so that the driving rod (R) is moved downward to drive the clamping legs (L) of the jaw unit to clamp the bit member (B) when the rotary shaft 11 is rotated in a clockwise direction and so that the clamping legs (L) of the jaw unit are driven to release the bit member (B) when the rotary shaft 11 is rotated in a counterclockwise direction. The upper end portion of the rotary shaft 11 has a periphery formed with a plurality of angularly spaced ratchet teeth 111. Each two adjacent ratchet teeth 111 cooperatively define an engaging space therebetween. A claw plate 14 is mounted pivotally on the top surface of the chuck body assembly 10 and has a claw portion 141. The claw plate 14 is biased by a spring unit 15 to engage the claw portion 141 within one of the engaging spaces so as to restrict undesired rotation of the rotary shaft 11 in the counterclockwise direction. A sleeve member 20 is sleeved on the chuck body assembly 10 and has an inner wall formed with two opposed keys 21. Each of the opposed keys 21 engages a corresponding one of the keyways 12. A pushing projection 22 projects from the inner wall of the sleeve member 20 and is adjacent to one of the opposed keyways 21. The pushing projection 22 has a distal end on which a contact plate 24 is mounted. The contact plate 24 is in slight contact with the claw plate 14 when the rotary shaft 11 is restricted to rotate in the counterclockwise direction. The sleeve member 20 further has a radial hole 25 formed in the periphery thereof and between the pushing projection 22 and the other one of the opposed keys 21. A rotary knob 30 is sleeved on the sleeve member 20 and has an inner wall formed with a through-hole 31 which allows the extension of the upper end portion of the rotary shaft 11 therethrough. A plurality of angularly spaced ratchet teeth 311 are formed on the inner wall of the rotary knob 30 and mesh with the ratchet teeth 111 of the rotary shaft 11 so that the rotary shaft 11 is rotatable with the rotary knob 30.

Referring now to FIG. 2, in a clamping operation, the rotary knob 30 is rotated in the clockwise direction to cause corresponding rotation of the rotary shaft 11 in a known manner. Thus, the driving rod (R) is moved downward to drive the clamping legs (L) to clamp the bit member (B).

Referring now to FIG. 3, in a releasing operation, the rotary knob 30 is rotated in the counterclockwise direction. Due to the provision of the claw portion 141, the rotary shaft 11 is restricted to rotate with the rotary knob 30. In order to rotate the rotary shaft 11 in the counterclockwise direction, the sleeve member 20 must be rotated in the clockwise direction at first in order to cause the contact plate 24 to abut against a contact portion 142 of the claw plate 14 so as to pivot the claw plate 14 in order to remove the claw portion 141 from one of the engaging spaces. At this time, the radial hole 25 is aligned with the positioning slot 13 and an additional tool, i.e. a retaining rod member (not shown), is inserted into the positioning slot 13 through the radial hole 25 in order to retain the contact plate 24 to abut against the contact portion 142 of the claw plate 14. At this stage, the rotary shaft 11 is rotated with the rotary knob 30 so as to move the driving rod (R) upward in order to drive the clamping legs (L) to release the bit member (B).

It is inconvenient and time-consuming to operate an additional tool, i.e. a retaining rod member, when releasing the bit member (B).

SUMMARY OF THE INVENTION

Therefore, the main object of the present invention is to provide a chuck assembly which makes it convenient to release a clamped bit member.

According to this invention, a chuck assembly includes a hollow chuck body, a jaw unit, a rotary shaft and a clutch assembly. The chuck body has an upper end, a lower end, a top surface and an annular outer edge. The jaw unit is disposed operatively in the chuck body and extends outwardly from the lower end of the chuck body. The rotary shaft is disposed rotatably in the chuck body and has an upper end portion extending outwardly from the upper end of the chuck body. The rotary shaft further has a lower end portion coupled with the jaw unit and is rotatable in a first direction to drive the jaw unit to clamp a bit member, and in a second direction to drive the jaw unit to release the bit member. The clutch assembly is provided on the upper end of the chuck body to restrict undesired rotation of the rotary shaft in the second direction. The clutch assembly comprises a movable ring, a sleeve member, a rotary knob, a coupling means, a ratchet means and a disengaging means. The movable ring is sleeved rotatably on the upper end portion of the rotary shaft and rests on the top surface of the chuck body. The movable ring has a top surface. The sleeve member is sleeved on the chuck body and has an inner wall surface. The rotary ring is sleeved on the upper end portion of the rotary shaft and is rotatable with the rotary shaft. The rotary ring has a top end, an outward flange member extending radially from the top end and resting on the top surface of the movable ring, and a bottom end surface. The rotary knob is sleeved on the sleeve member and has a plate portion formed with a central through-hole which is sized to permit extension of the upper end portion of the rotary shaft therethrough. The rotary knob is operable to rotate the rotary shaft. The coupling means includes two first opposed keyways formed in the top surface of the chuck body, and two second opposed keyways formed on a periphery of the movable ring, each of the second opposed keyways being aligned with a corresponding one of the first opposed keyways and having a width smaller than the corresponding one of the first opposed keyways. The coupling means further includes two opposed keys extending from the inner wall surface of the sleeve member. Each of the keys is sized to engage a respective one of the first opposed keyways and a respective one of the second opposed keyways which corresponds to the respective one of the first opposed keyways. The ratchet means includes first annularly arranged ratchet teeth formed on the top surface of the chuck body and located between the outer edge of the chuck and the upper end portion of the rotary shaft, and second annularly arranged ratchet teeth formed on the bottom end surface of the rotary ring. The first ratchet teeth engage the second ratchet teeth to restrict undesired rotation of the rotary shaft in the second direction. The disengaging means includes two opposite slide grooves formed in the top surface of the chuck body. Each of the slide grooves is defined by a groove bottom having two ends, an orthogonal surface extending from the top surface to one end of the groove bottom, and an inclined contact surface extending from the top surface to the other end of the groove bottom. The disengaging means further includes two opposed downwardly extending flange portions formed on the bottom surface of the movable ring. Each of the flange portions complements a corresponding one of the slide grooves of the chuck body and has an inclined contact surface which abuts the inclined contact surface of the corresponding one of the opposed grooves. Therefore, rotation of the sleeve member in one direction causes corresponding rotation of the movable ring and results in movement of the inclined contact surfaces of the flange portions along the inclined contact surfaces of the slide grooves so as to disengage the second ratchet teeth from the first ratchet teeth and permit rotation of the rotary shaft in the second direction.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 4:
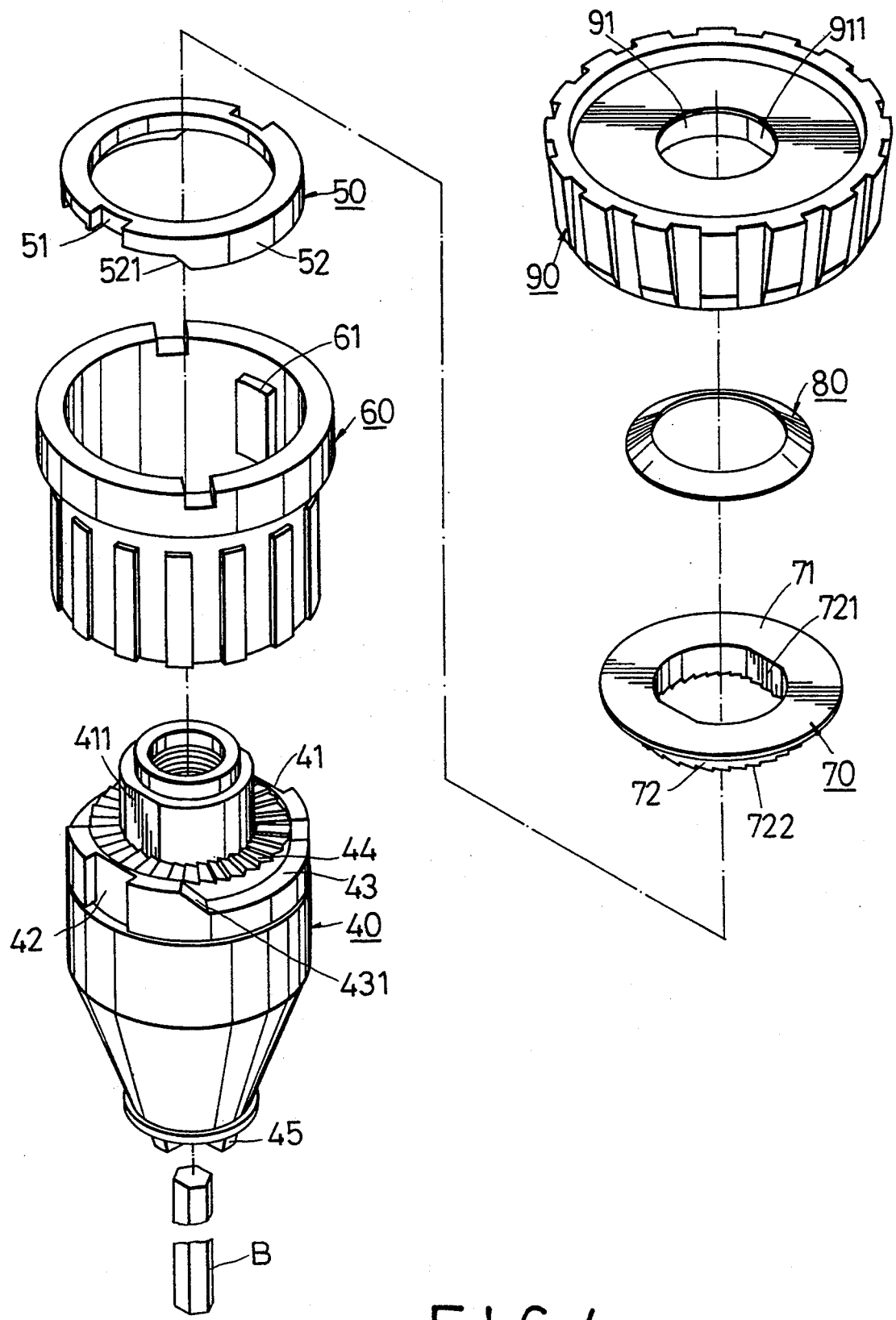
FIG. 4 is an exploded view of a chuck assembly according to the present invention.

Referring to FIG. 4, a chuck assembly according to the present invention includes a hollow chuck body assembly 40, a jaw unit, a rotary shaft 41 and a clutch assembly.

The hollow chuck body assembly 40 has an upper end, a lower end, a top surface and an annular outer edge.

Figure 1:
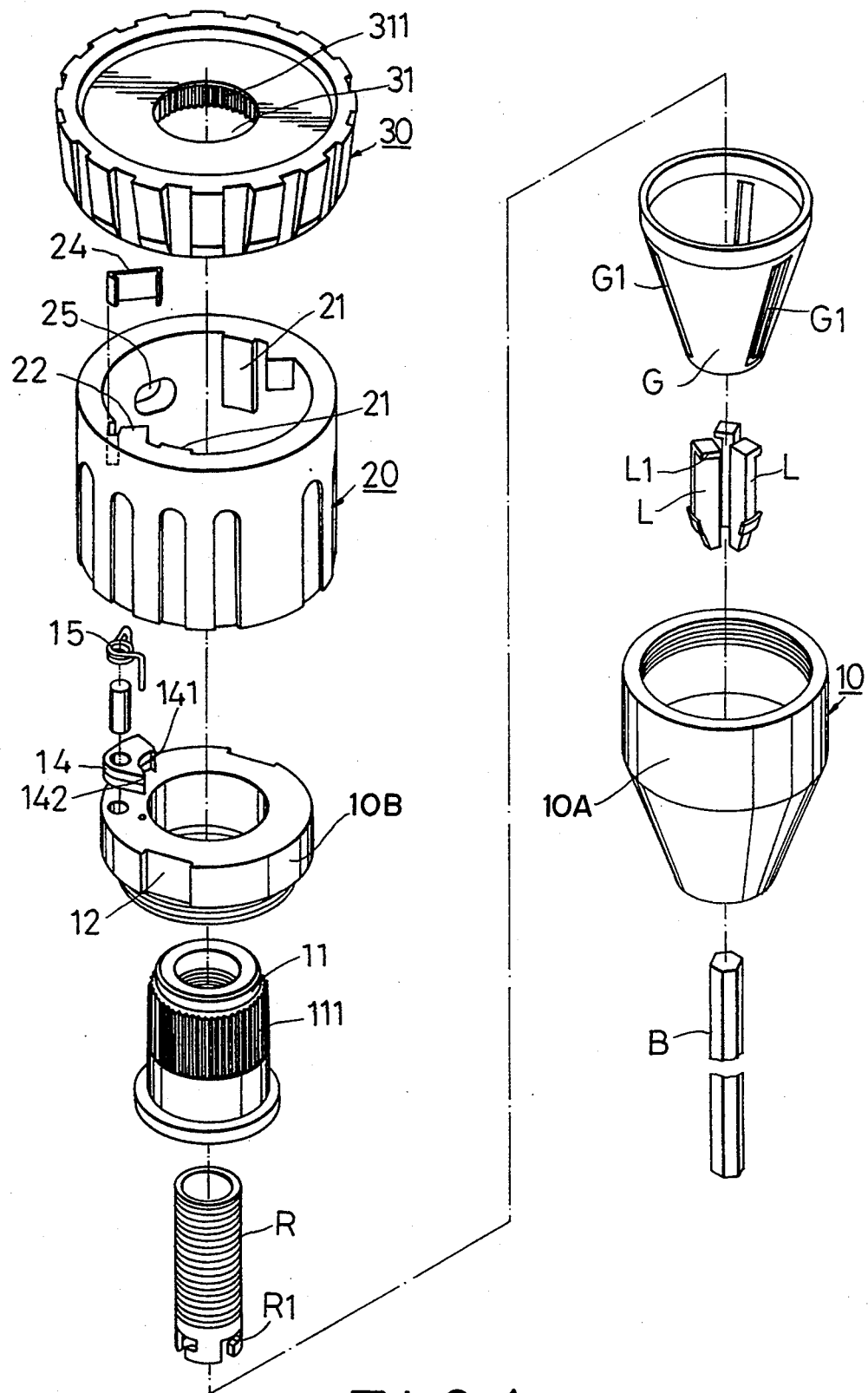
FIG. 1 is an exploded view of a conventional chuck assembly.
Figure 2:
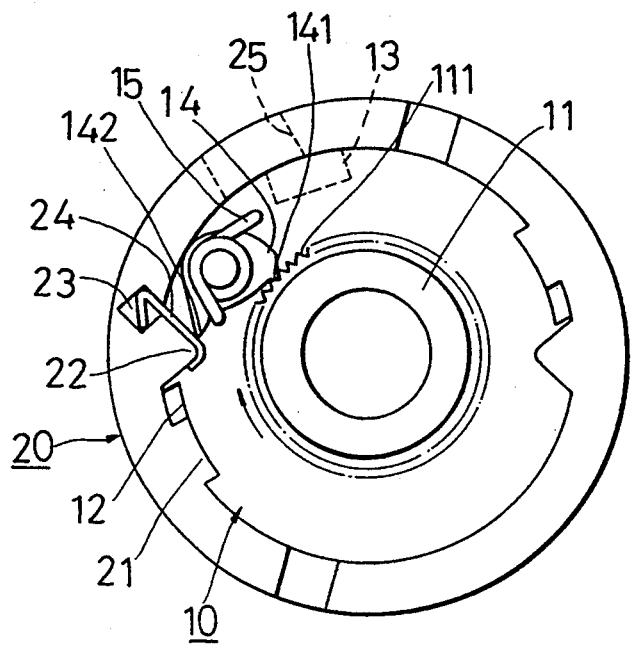
FIG. 2 is a schematic view showing how the conventional chuck assembly is operated so as to clamp a bit member.
Figure 3:
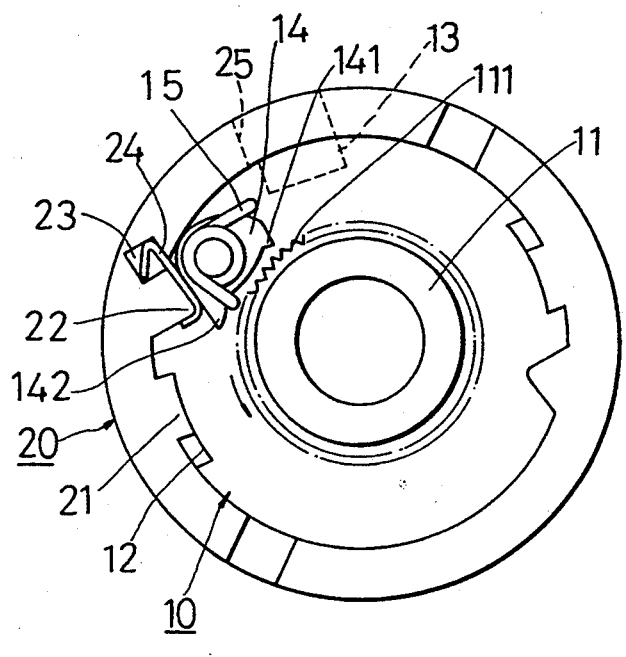
FIG. 3 is a schematic view showing how the conventional chuck assembly is operated so as to release the bit member.

The jaw unit is disposed operatively in the chuck body assembly 40 in a manner similar to that of the conventional chuck assembly shown in FIG. 1. Each of the clamping legs 45 of the jaw unit has a lower portion extending outwardly from the lower end of the chuck body assembly 40.

The rotary shaft 41 is disposed rotatably in the chuck body assembly 40 and has an upper end portion extending outwardly from the upper end of the chuck body assembly 40. The upper end portion of the rotary shaft 41 has a periphery formed with two opposed planar surfaces 411. The rotary shaft 41 further has a lower end portion coupled with the jaw unit in a manner similar to that of the conventional chuck assembly. The rotary shaft 41 is rotatable in a first direction to drive the jaw unit to clamp the bit member (see FIG. 5), and in a second direction to drive the jaw unit to release the bit member (B) (see FIG. 6).

The clutch assembly includes a movable ring 50, a sleeve member 60, a rotary ring 70, a biasing means 80, a rotary knob 90, a coupling means, a ratchet means and a disengaging means.

The movable ring 50 is sleeved rotatably on the upper end portion of the rotary shaft 41 and rests on the top surface of the chuck body assembly 40. The movable ring 50 has a top surface.

The sleeve member 60 is sleeved on the chuck body assembly 40 and has an inner wall surface.

The rotary ring 70 is sleeved on the upper end portion of the rotary shaft 41 and has an inner wall surface formed with two opposed planar surfaces 721 which abut against the planar surfaces 411 of the rotary shaft 41 such that the rotary ring 70 is rotatable with the rotary shaft 41. The rotary ring 70 has a top end, an outward flange member 71 extending radially from the top end and resting on the top surface of the movable ring 50, and a bottom end surface.

The rotary knob 90 is sleeved on the sleeve member 60 and has a plate portion formed with a central through-hole which is sized to permit extension of the upper end portion of the rotary shaft 41 therethrough. The plate portion of the rotary knob 90 has an inner wall surface 91 which defines the through-hole and which has two opposed planar surfaces 911 formed thereon. The planar surfaces 911 of the rotary knob 90 abut against the planar surfaces 411 of the rotary shaft 41 so that the rotary shaft 41 is rotated when the rotary knob 90 is operated.

The coupling means includes two first opposed keyways 42 formed in the top surface of the chuck body assembly 40, and two second opposed keyways 51 formed on a periphery of the movable ring 50. Each of the second opposed keyways 51 is aligned with a corresponding one of the first opposed keyways 42 and has a width smaller than the corresponding one of the first opposed keyways 42. The coupling means further includes two opposed keys 61 extending from the inner wall surface of the sleeve member 60. Each of the keys 61 is sized to engage a respective one of the first opposed keyways 42 and a respective one of the second opposed keyways 51 which corresponds to the respective one of the first opposed keyways 42.

The ratchet means includes first annularly arranged ratchet teeth 44 formed on the top surface of the chuck body assembly 40 and located between the outer edge of the chuck body assembly 40 and the upper end portion of the rotary shaft 41. The ratchet means further includes second annularly arranged ratchet teeth 722 formed on the bottom end surface of the rotary ring 70. The first ratchet teeth 44 engage the second ratchet teeth 722 to restrict undesired rotation of the rotary shaft 41 in the second direction.

The biasing means 80 is interposed between the flange member 71 of the rotary ring 70 and the plate portion of the rotary knob 90 so as to bias the second ratchet teeth 722 toward the first ratchet teeth 44. In the present embodiment, the biasing means 80 is an annular convex plate.

The disengaging means includes two opposite slide grooves 43 formed in the top surface of the chuck body assembly 40. Each of the slide grooves 43 is defined by a groove bottom having two ends, an orthogonal surface extending from the top surface to one end of the groove bottom and an inclined contact surface 431 extending from the top surface to the other end of the groove bottom. The disengaging means further includes two opposed downwardly extending flange portions 52 formed on the bottom surface of the movable ring 50. Each of the flange portions 52 complements a corresponding one of the slide grooves 43 of the chuck body assembly 40 and has an inclined contact surface 521 which abuts the inclined contact surface 431 of the corresponding one of the opposed grooves 43. It will be shown in the succeeding paragraphs that the rotation of the sleeve member 60 in one direction causes corresponding rotation of the movable ring 50 and results in movement of the inclined contact surfaces 521 of the flange portions 52 along the inclined contact surfaces 431 of the slide grooves 43 so as to disengage the second ratchet teeth 722 from the first ratchet teeth 44 and permit rotation of the rotary shaft 41 in the second direction.

Figure 5:
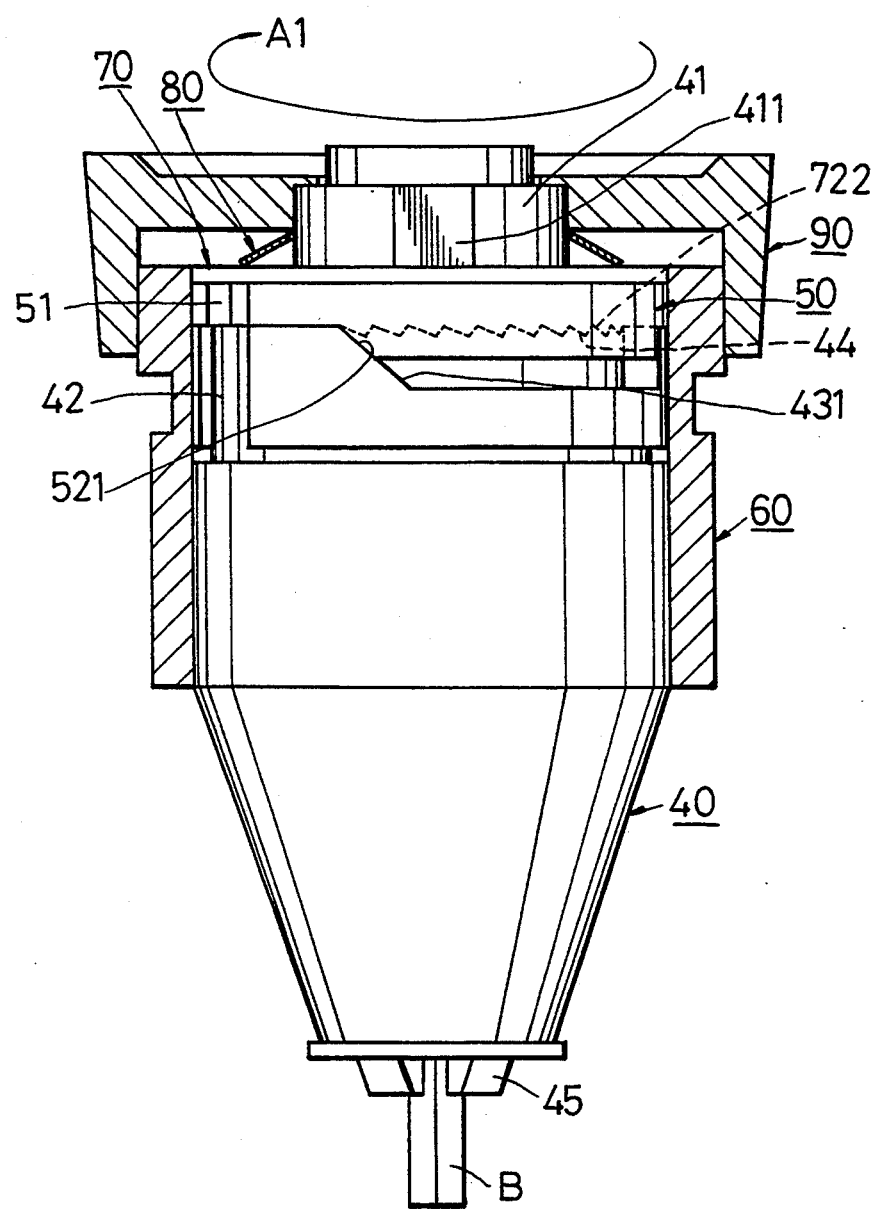
FIG. 5 is a schematic view showing how the chuck assembly according to the present invention is operated so as to clamp a bit member.

Referring now to FIG. 5, during a clamping operation, the bit member (B) is placed among the clamping legs 45 of the jaw unit, and the rotary knob 90 is rotated in the first direction, i.e. in the clockwise direction, as indicated by the arrow (A1), thereby rotating the rotary shaft 41. Since the rotary ring 70 is permitted to rotate synchronously with the rotary shaft 41 in this direction, the rotary shaft 41 is thus rotatable with the rotary knob 90 to drive the clamping legs 45 of the jaw unit to clamp tightly the bit member (B) thereamong.

Figure 6:
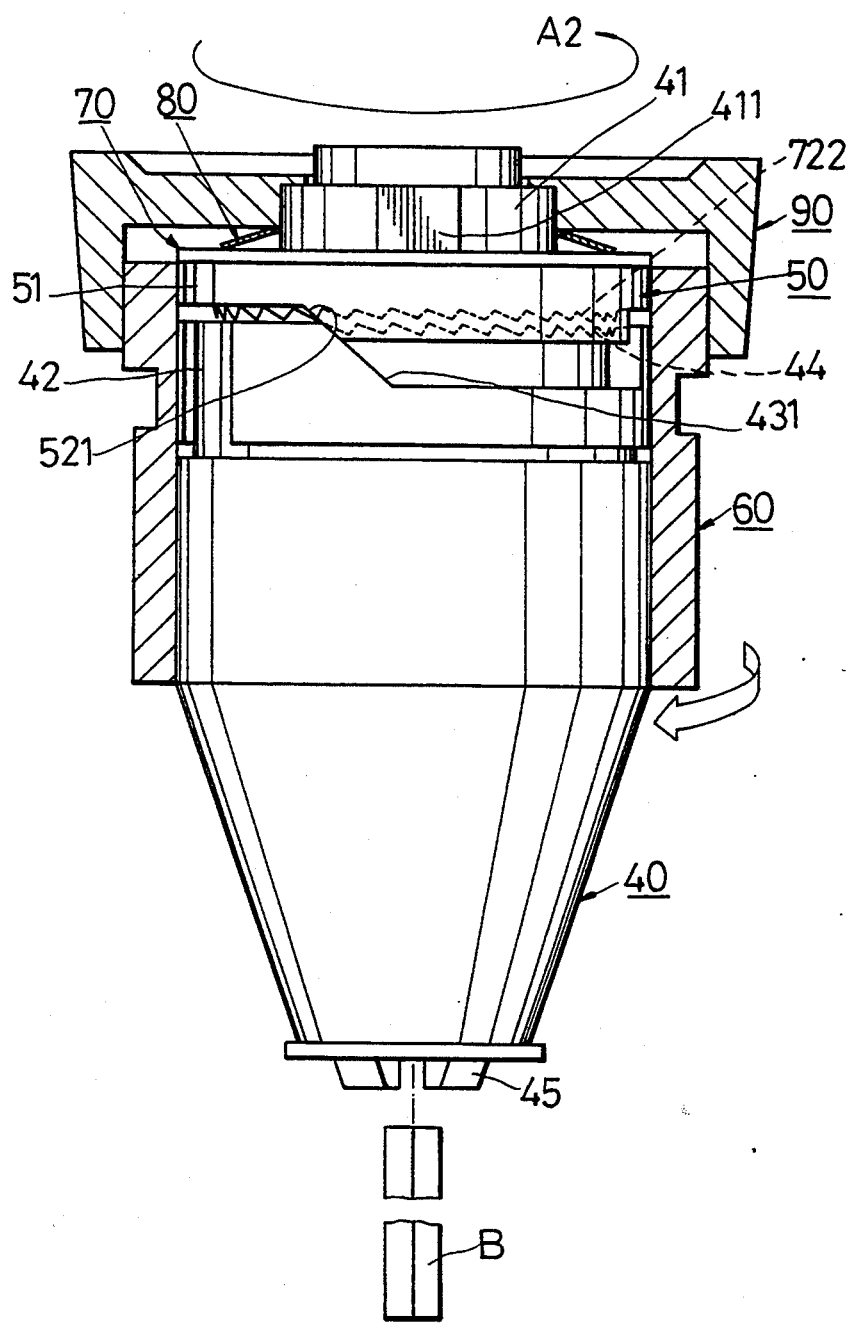
FIG. 6 is a schematic view showing how the chuck assembly according to the present invention is operated so as to release the bit member.

Referring now to FIG. 6, when it is desired to release the bit member (B) from the chuck member, the sleeve member 60 must be rotated in a clockwise direction at first so as to result in the movement of the inclined contact surfaces 521 of the movable rings 52 along the inclined contact surfaces 431 of the slide grooves 43 so as to disengage the second ratchet teeth 722 from the first ratchet teeth 44. Thus, the rotary shaft 41 is permitted to rotate with the rotary knob 90 in the second direction, i.e. in the counterclockwise direction, as indicated by the arrow (A2), so as to drive the clamping legs 45 of the jaw unit to release the bit member (B).

The annular convex plate 80 is compressed when the rotary ring 70 is moved upward due to the movement of the inclined contact surfaces 521 of the flange portions 52 of the movable ring 50 relative to the inclined contact surfaces 431 of the slide grooves 43. When the rotary ring 70 is moved downward, the convex plate 80 biases the rotary ring 70 to engage tightly the first ratchet teeth 44 with the second ratchet teeth 722 again.

The chuck assembly of the prevent invention has the following advantages:

1. There is no need to use any additional tools for operating the chuck assembly to clamp or release a bit member (B).

2. Since no additional tools are used, the operating time is reduced. Furthermore, the required force for rotating the sleeve member 60 of the present invention is reduced when compared to the required force for overcoming the restoring force of the spring employed in the conventional chuck assembly.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A chuck assembly for holding releasably a bit member, said chuck assembly including
    a hollow chuck body assembly having an upper end, a lower end, a top surface and an annular outer edge,
    a jaw unit disposed operatively in said chuck body assembly and extending outwardly from said lower end of said chuck body assembly,
    a rotary shaft disposed rotatably in said chuck body assembly and having an upper end portion extending outwardly from said upper end of said chuck body assembly, said rotary shaft further having a lower end portion coupled with said jaw unit and being rotatable in a first direction to drive said jaw unit to clamp said bit member, and in a second direction to drive said jaw unit to release said bit member, and
    a clutch assembly provided on said upper end of said chuck body assembly to restrict undesired rotation of said rotary shaft in said second direction, said clutch assembly comprising:
    a movable ring which is sleeved rotatably on said upper end portion of said rotary shaft and which rests on said top surface of said chuck body assembly, said movable ring having a top surface;
    a sleeve member which is sleeved on said chuck body assembly and which has an inner wall surface;
    a rotary ring sleeved on said upper end portion of said rotary shaft and rotatable with said rotary shaft, said rotary ring having a top end, an outward flange member extending radially from said top end and resting on said top surface of said movable ring, and a bottom end surface;

a rotary knob sleeved on said sleeve member and having a plate portion formed with a central through-hole which is sized to permit extension of said upper end portion of said rotary shaft therethrough, said rotary knob being operable to rotate said rotary shaft;

a coupling means including two first opposed keyways formed in said top surface of said chuck body assembly, two second opposed keyways formed on a periphery of said movable ring, each of said second opposed keyways being aligned with a corresponding one of said first opposed keyways and having a width smaller than said corresponding one of said first opposed keyways, and two opposed keys extending from said inner wall surface of said sleeve member, each of said keys being sized to engage a respective one of said first opposed keyways and a respective one of said second opposed keyways which corresponds to said respective one of said first opposed keyways;

a ratchet means including first annularly arranged ratchet teeth formed on said top surface of said chuck body assembly and located between said outer edge of said chuck and said upper end portion of said rotary shaft, and second annularly arranged ratchet teeth formed on said bottom end surface of said rotary ring, said first ratchet teeth engaging said second ratchet teeth to restrict undesired rotation of said rotary shaft in said second direction; and a disengaging means including two opposite slide grooves formed in said top surface of said chuck body assembly, each of said slide grooves being defined by a groove bottom having two ends, an orthogonal surface extending from said top surface to one end of said groove bottom, and an inclined contact surface extending from said top surface to the other end of said groove bottom, said disengaging means further including two opposed downwardly extending flange portions formed on said bottom surface of said movable ring, each of said flange portions complementing a corresponding one of said slide grooves of said chuck body assembly and having an inclined contact surface which abuts said inclined contact surface of said corresponding one of said opposed grooves;

whereby, rotation of said sleeve member in one direction causes corresponding rotation of said movable ring and results in movement of said inclined contact surfaces of said flange portions along said inclined contact surfaces of said slide grooves so as to disengage said second ratchet teeth from said first ratchet teeth and permit rotation of said rotary shaft in said second direction.

2. A chuck assembly as claimed in claim 1, wherein said upper end portion of said rotary shaft has a periphery formed with two opposed planar surfaces, said rotary ring having an inner wall surface formed with two opposed planar surfaces which abut against said planar surfaces of said rotary shaft, said plate portion of said rotary knob having an inner wall surface which defines said through-hole and which has two opposed planar surfaces formed thereon, said planar surfaces of said rotary knob abutting against said planar surfaces of said rotary shaft.

3. A chuck assembly as claimed in claim 1, further comprising a biasing means which is interposed between said flange member of said rotary ring and said plate portion of said rotary knob for biasing said second ratchet teeth toward said first ratchet teeth.

4. A chuck assembly as claimed in claim 3, wherein said biasing means is an annular convex plate.

* * * * *